J. H. JACOBS.
AUTOMATIC COOKER.
APPLICATION FILED JULY 9, 1919.
1,341,748.
Patented June 1, 1920.
2 SHEETS—SHEET 1.
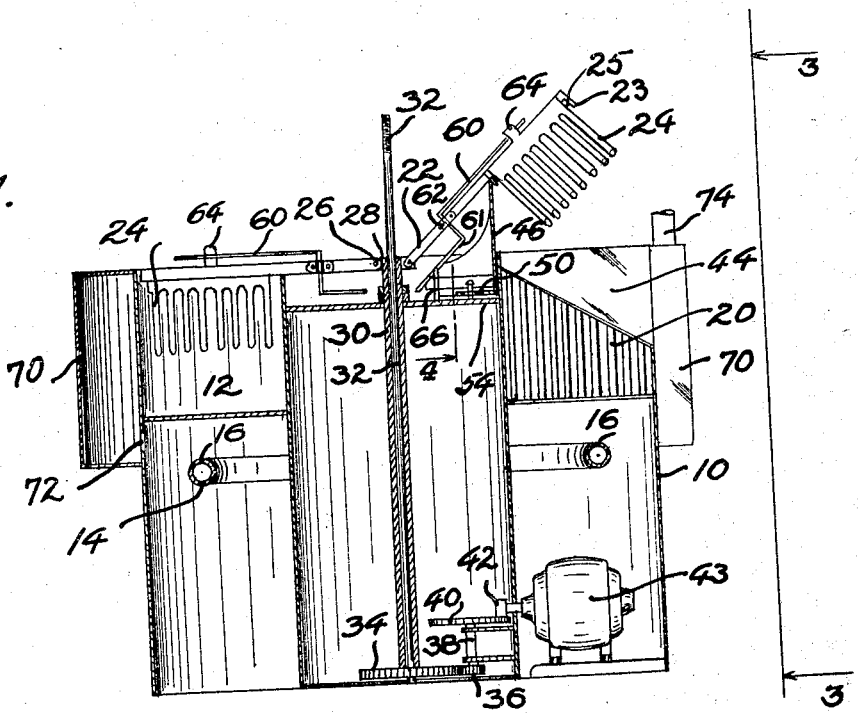
Fig. 1.
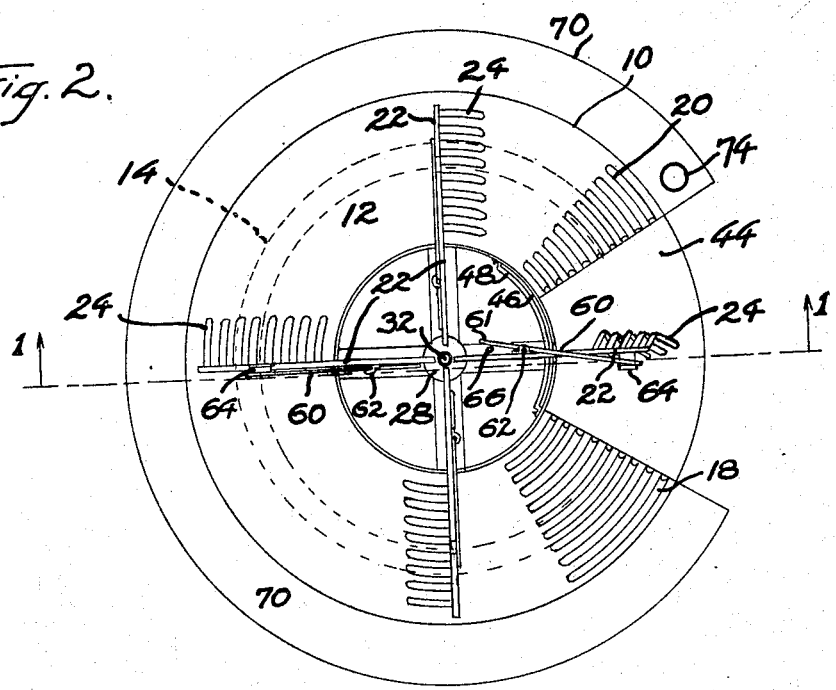
Fig. 2.
Inventor
J. H. Jacobs.
By 
Attorney J. H. JACOBS.
AUTOMATIC COOKER.
APPLICATION FILED JULY 9, 1919.
1,341,748.
Patented June 1, 1920.
2 SHEETS—SHEET 2.
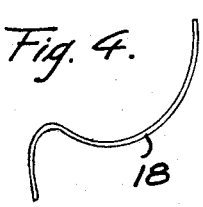
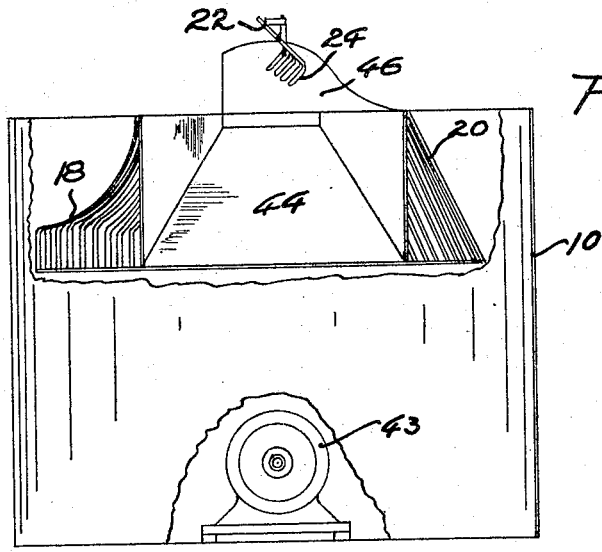
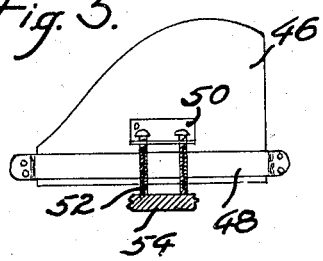
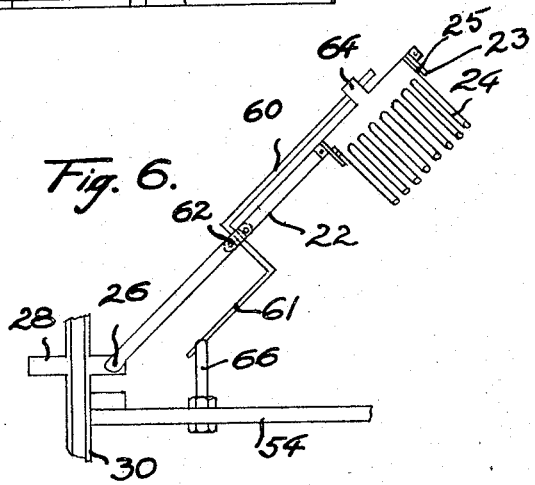
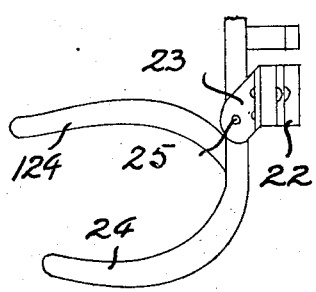
Inventor
J. H. Jacobs.
By
Attorney

UNITED STATES PATENT OFFICE.

JOSEPH H. JACOBS, OF DENVER, COLORADO.

AUTOMATIC COOKER.

1,341,748.  Specification of Letters Patent.  Patented June 1, 1920.

Application filed July 9, 1919. Serial No. 309,646.

*To all whom it may concern:*

Be it known that I, JOSEPH H. JACOBS, a citizen of the United States, residing at the city and county of Denver and State of Colorado, have invented certain new and useful Improvements in Automatic Cookers; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to automatic cooking devices for use where the articles to be cooked are to be moved through a cooking liquid during a definite time only. The object of the invention is to provide a simple device for moving the articles through the liquid and automatically discharging them therefrom upon completion of the cooking process. It is also an object to provide a device whereby the time during which the articles remain in the bath may be varied as required. The device may be used for household purposes, as for frying doughnuts, potato chips and the like, or for scalding tomatoes preparatory to canning. On a larger scale, the device may be used in packing houses, both for preparing fruits and vegetables, and also meat products.

Briefly, the invention comprises a casing having a circular trough therein for the cooking liquid, and a plurality of rotary arms provided with means for engaging the articles being cooked, to move them through the bath and discharge them.

In the drawings:

Figure 1 is a vertical section taken on the line 1—1 of Fig. 2.

Fig. 2 is a plan view.

Fig. 3 is an elevation from line 3—3 of Fig. 1, with the outer heat chamber omitted, and a portion of the casing wall broken away to disclose the internal structure.

Fig. 4 is a detail of receiving guides positioned in the cooking trough.

Fig. 5 is a detail on the line 5 of Fig. 1, showing the cam for elevating the advancing arms and the means for adjusting the same.

Fig. 6 is a detail, showing the means for rocking each advancing member to discharge the articles after being elevated from the trough.

Fig. 7 is an enlarged detail of a slightly modified form of advancing means to be used in cooking articles whose tendency is to float.

The casing 10 is provided with a circular trough 12, adapted to receive the cooking fluid. Positioned immediately below the trough is a gas burner 14, having jets 16 formed in the top thereof. This burner may be of any desired construction and connected with a gas supply by means of suitable connections. Mounted at the receiving point in the trough is a grating composed of a plurality of guides 18, each of which has a cupped portion, as shown in Fig. 4, to receive the articles. At the discharge point of the trough a plurality of straight guides 20 is provided to assist in the removal of the articles when cooked.

Radiating from the center of the machine is a plurality of rotary arms 22, whose outer ends are equipped with brackets 23, in which there are hinged at 25 curved fingers 24, these fingers being spaced and arranged to pass between the guides 18 and 20. Each arm 22 is pivoted as shown at 26 to a center member 28, mounted on a tube 30, which is rotatable about a positioning spindle 32. At its lower end the tube 30 carries a gear 34, meshing with a pinion 36 on a short shaft 38, suitably connected with the casing. The upper end of the shaft 38 carries a friction disk 40, adapted to be engaged by a friction wheel 42, driven by a motor 43. The wheel 42 is adjustable radially of the disk 40 in order to vary the speed of the rotating mechanism.

A chute 44 is positioned between the receiving grating 18 and the discharge grating 20, this chute receiving the discharged articles. Positioned adjacent the chute 44 and connected with the casing, is an adjustable cam member 46, slidable vertically between the casing wall and the guide strap 48. An offset piece 50, connected with the cam 46, is provided with a plurality of adjusting screws 52, which engage the horizontal wall 54 of the casing. By means of these screws the cam member 46 may be raised or lowered, as desired, to obtain the proper elevation of the advancing fingers 24.

In Fig. 7 a modified form of advancing means is disclosed, comprising the fingers 24 and a set of upper fingers 124. This form is to be used to hold articles in the bath which otherwise would float upon the surface.

In order to rock the fingers for discharge of the articles, particularly when the style of construction of Fig. 7 is used, a rock arm 60 having an offset lower portion 61, is employed. A member 60 is pivoted on each of the arms 22, as indicated at 62. The outer end of the member is adapted to engage an offset lug 64, connected with the fingers 24, and the lower end 61 is adapted to engage an upstanding pin 66, mounted in the horizontal wall 54.

An annular heat chamber 70 is positioned about the casing 10, as shown in Figs. 1 and 2, and a plurality of openings through the casing 10 affords communication between the combustion chamber and the heat chamber, one of these openings being shown at 72 in Fig. 1. An exit conduit 74 is provided in the upper portion of this heat chamber at a point adjacent the discharge guides 20. The rest of the openings 72 are provided in the casing at the side opposite the exit 74.

In the operation of the device, the articles are fed preferably automatically by any satisfactory machine into receiving grating 18. As the fingers 24 are allowed to descend by the cam 46, they pass between the guides of the grating 18 and engage the article therein, as the arm rotates it carries the article of articles held by the fingers 24 through the bath to the discharge grating 20. As the cam member 46 causes an arm 22 to be elevated, the fingers 24 pass between the fingers of the grating 20, and the inclination of the grating produces an easy upward movement of the articles thereon until they are raised above the top of the casing. In order to positively discharge the articles from the fingers, engagement of the lower arm 61 of the rocking member 60 with the pin 66 will cause said lower end to swing in a reverse direction, while the outer end engages the lug 64, swinging it in a forward direction to tip the fingers and dump the cooked articles into the chute, from which they are discharged into any satisfactory receiving means.

By causing the heated products of combustion to pass out through the openings 72 and confining them within the heat chamber 70 until they reach the exit 74, the maximum heat efficiency is obtained. The products of combustion are thereby caused to travel around a considerable portion of the casing and thereby heat the outer side walls of the trough. The spent products of combustion may then be conducted to a chimney.

I claim:

1. In an automatic cooking apparatus, a circular trough, rotary arms having curved fingers thereon to carry articles to be cooked through a fluid in said trough and to lift said articles from the fluid.

2. In an automatic cooking apparatus, a circular trough, rotary arms having curved fingers thereon to carry articles to be cooked through a fluid in said trough and to lift said articles from the fluid, and inclined guides at the discharge end of said trough to facilitate removal of said articles.

3. In an automatic cooking apparatus, a circular trough, adapted to contain a cooking fluid, rotary arms having means thereon to engage articles to be cooked and move them through said trough, and a cupped receiving grating at the receiving end of said trough, from which said means on said arms are adapted to remove the articles prior to their travel through the cooking bath.

4. In an automatic cooking device, a circular trough adapted to contain a cooking fluid, rotary arms having fingers thereon to engage and propel articles to be cooked through said bath, a grating at the receiving end of said trough, composed of spaced fingers, and a grating at the discharge end of said trough composed of spaced fingers, the fingers of said arms being adapted to pass between the fingers of said grating.

5. In an automatic cooking apparatus, a circular trough adapted to contain a cooking fluid, rotary arms having means thereon to engage and propel articles to be cooked through said trough, a chute, and a cam adjacent said chute to elevate said arms for discharging the cooked articles.

6. In an automatic cooking device, a circular trough adapted to contain a cooking fluid, rotary arms having curved fingers to engage and propel the articles to be cooked through the trough, a chute, a cam to elevate said arms as they approach said chute, and means to rock said fingers to positively discharge said articles into said chute.

7. In an automatic cooking apparatus, a circular trough, rotary arms having curved fingers thereon to carry articles to be cooked through a fluid in said trough and to lift said articles from the fluid, and means to elevate said arms and fingers for the purpose of discharging said articles from said fingers.

8. In an automatic cooking apparatus, a circular trough, rotary arms, an upper and lower sets of connected fingers on said arms to carry articles through the fluid in the trough, to hold said articles down in the fluid and to lift them from the fluid.

9. In an automatic cooking device, a circular trough adapted to contain a cooking fluid, rotary arms having means thereon to advance the articles to be cooked through said fluid, means to elevate said arms, a member pivoted on each arm, a stationary pin positioned in the path of the inner end of said member, the outer end of said member being connected with said advancing means, whereby engagement of the inner end of said member with said pin will cause the outer end of said member to rock said advancing means.

In testimony whereof I affix my signature.

JOSEPH H. JACOBS.